Dec. 17, 1963 S. F. KENNEDY 3,114,538
PORTABLE FORCED HEAT DRYER
Filed May 25, 1962 3 Sheets-Sheet 1
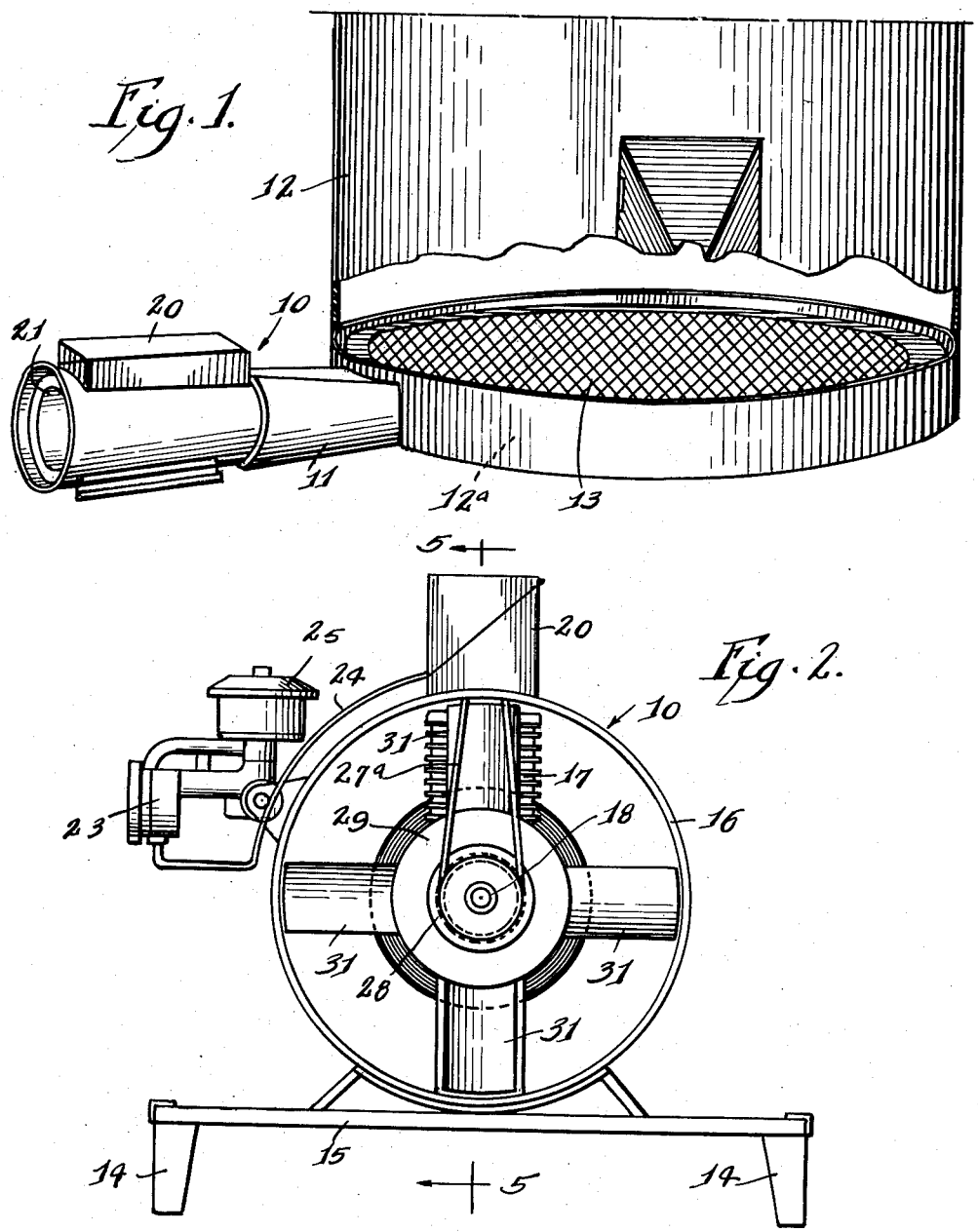
Inventor.
Samuel F. Kennedy
By Zabel, Baker, York,
Jones, & Dithmar
Attorneys Dec. 17, 1963    S. F. KENNEDY    3,114,538
PORTABLE FORCED HEAT DRYER
Filed May 25, 1962    3 Sheets-Sheet 2
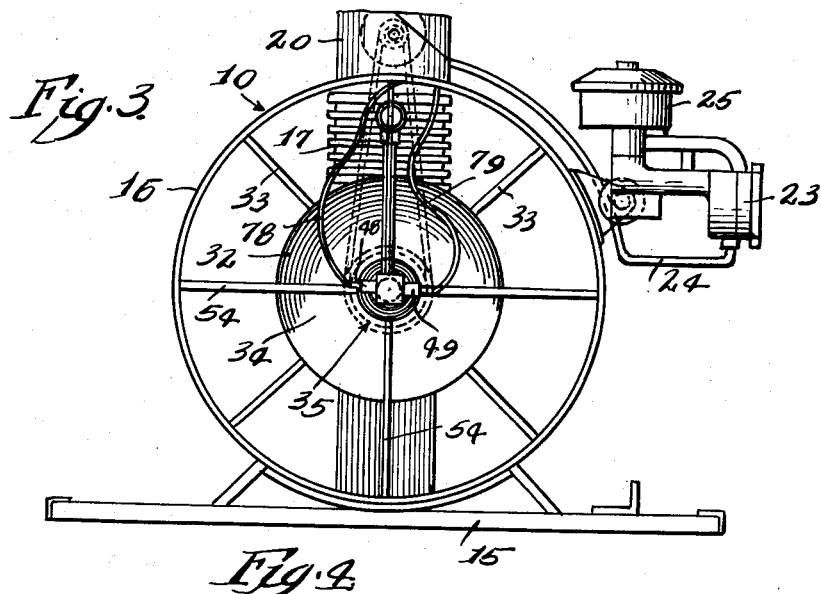
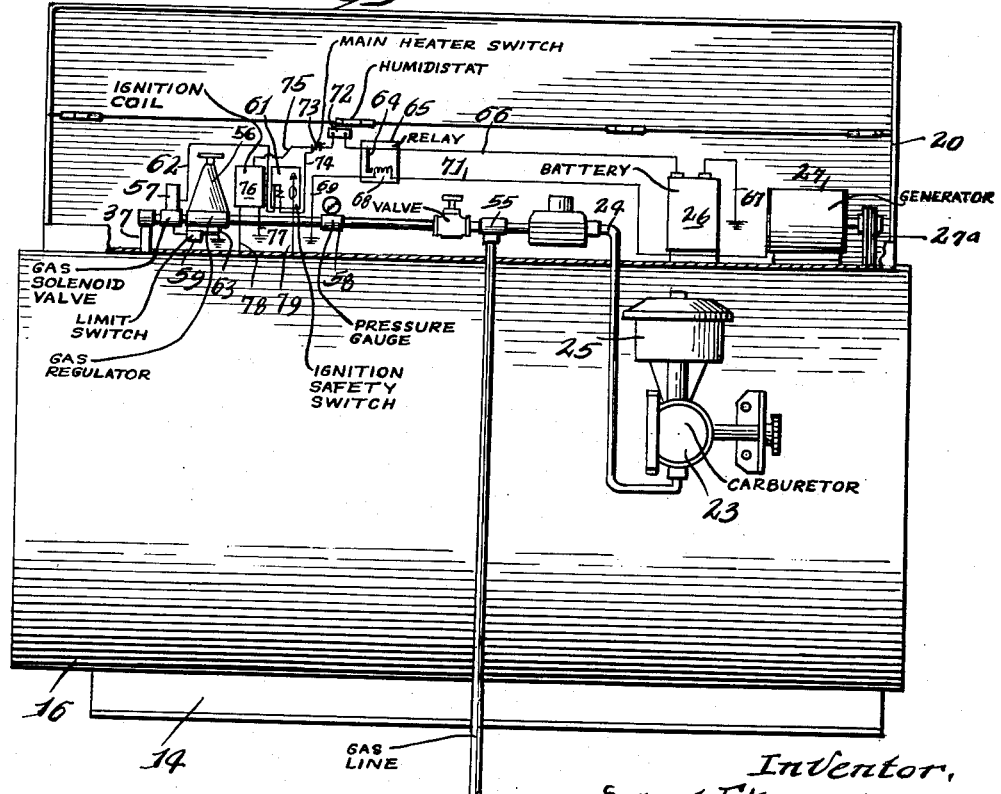
Inventor,
Samuel F. Kennedy.
By Zabel, Baker, York,
Jones & Dithmar
Attorneys.

Dec. 17, 1963   S. F. KENNEDY   3,114,538
PORTABLE FORCED HEAT DRYER
Filed May 25, 1962   3 Sheets-Sheet 3

Inventor.
Samuel F. Kennedy.
By Zabel, Baker, York,
Jones & Dithmar
Attorneys.

United States Patent Office 3,114,538
Patented Dec. 17, 1963

3,114,538
PORTABLE FORCED HEAT DRYER
Samuel F. Kennedy, Taylorville, Ill., assignor to S. F. Kennedy New Products, Inc., Taylorville, Ill., a corporation of Delaware
Filed May 25, 1962, Ser. No. 197,684
7 Claims. (Cl. 263—19)

The present invention relates to a forced air heating system and more particularly to a portable forced air heater utilized for drying materials such as grains in storage bins on farms or in remote areas, which dryers are completely separated from or devoid of electrical service.

Modern farming methods to be profitable require substantially greater areas to farm than ever. Most modern farms are made up of several sections or areas of ground not necessarily adjoining and in some cases separated by substantial distances. Where grains constitute a large percentage of a farmer's marketable crop, he must have adequate harvesting, storage and drying facilities to reduce the amount of field losses or spoilage of the crop.

Natural air drying of grains in the field has limitations and losses of the commodity in harvesting due to adverse weather conditions are high. Early harvest of a commodity with a fairly high moisture content can save as much as twenty percent of the field losses incurred due to natural air drying. However, high moisture grain must be dried immediately by some method to a level suitable for storage either prior to placing the commodity in storage or drying it in the storage structure.

Drying units operated by electricity are limited as to size and flexibility. In most rural areas, a motor of no greater than five horsepower is permitted and, to make matters worse, the only type of power available is single phase. Single phase motors are not sufficiently dependable and difficulties increase on available current supply that cannot maintain proper line voltage. A drop in voltage for even a relatively short period, such as thirty seconds, can cause serious damage to the motor, often burning out the windings.

Furthermore, electrical installations would be required on each parcel of ground where grain is to be dried and stored for the efficient handling of the commodity. Large transformers and heavy lines are costly when installed and serve only a short interval during each year; consequently, high minimum charges per month are a recurring factor.

The present invention has been designed to obviate these above stated difficulties by providing a grain dryer that is driven by an internal combustion engine powered by liquid petroleum gas which is readily available in substantially all rural or farm areas in bottles or other containers. Further, the grain drying is accomplished to a storable moisture content in the bin or storage container where it is to be subsequently stored to eliminate extra handling and resulting damage to the commodity.

An important object of the present invention is the provision of a novel portable dryer for use with storage bins or containers for drying grain or like commodity in the bin. This method of drying has been found to be the most effective, with the dryer forcing heated air to a suitable temperature up through a perforated grating or floor upon which the commodity rests and up through the commodity to reduce its moisture content.

Another object of the present invention is the provision of a portable dryer which is completely independent of electrical sources used for rural areas. The engine operating the forced air fan or blower is powered by suitable liquid petroleum (L.P.) gas which is readily available in farm areas. The dryer being portable, may be readily and easily moved from place to place to dry grain or other commodity in the storage bins at different areas or locations.

A further object of the present invention is the provision of a dryer having an engine powered by L.P. gas which is directly connected to the blower or circulating fan and is positioned in the path of the air stream so that the air cools the motor while the motor helps heat the air to the desired temperature for efficient drying. Further, the exhaust from the engine is combined with additional fuel and ignited to heat the air stream to the desired drying temperature.

The present invention further comprehends the provision of a portable air heater where the direction of the flame utilized for heating the air is countercurrent to the direction of flow of the air stream, with the ignited gases being directed to a target in the center of the air stream which reverses the direction of the flame and aids in its dispersion in the air stream to heat the same.

The present invention also comprehends the provision of a novel control system for the heating portion of the dryer to prevent any accumulation of unburned gases. A gas solenoid valve is placed in the fuel line leading to the igniter; the igniter including an electrode and a thermocouple. As the spark is discharged, the thermocouple is heated until it reaches a temperature where a relay connected thereto opens the gas solenoid valve. Therefore, gas is not released to the igniter until the ignition system is functioning properly whereupon the gas is immediately ignited. Thus the operator is assured that all gas admitted through the orifice will be ignited and there will not be any wastage. This safety feature prevents any accumulation of unburned gases which might promote an explosion hazard.

Further objects are to provide a construction of maximum simplicity, efficiency, economy and ease of assembly and operation, and such further objects, advantages and capabilities as will later more fully appear and are inherently possessed thereby.

In the drawings:
FIGURE 1 is a perspective view of the dryer of the present invention connected to the base of a grain storage bin.

FIG. 2 is an end view of the intake or entrance end of the dryer showing the mounting of the internal combustion engine and the blower or air fan driven thereby.

FIG. 3 is an end view of the opposite outlet or discharge end of the dryer showing the ignition assembly for heating the air driven through the dryer by the blower.

FIG. 4 is a side elevational view of the dryer showing the control system within a housing on the top of the dryer for feeding gas to the ignition system and to the engine.

Figure 5:
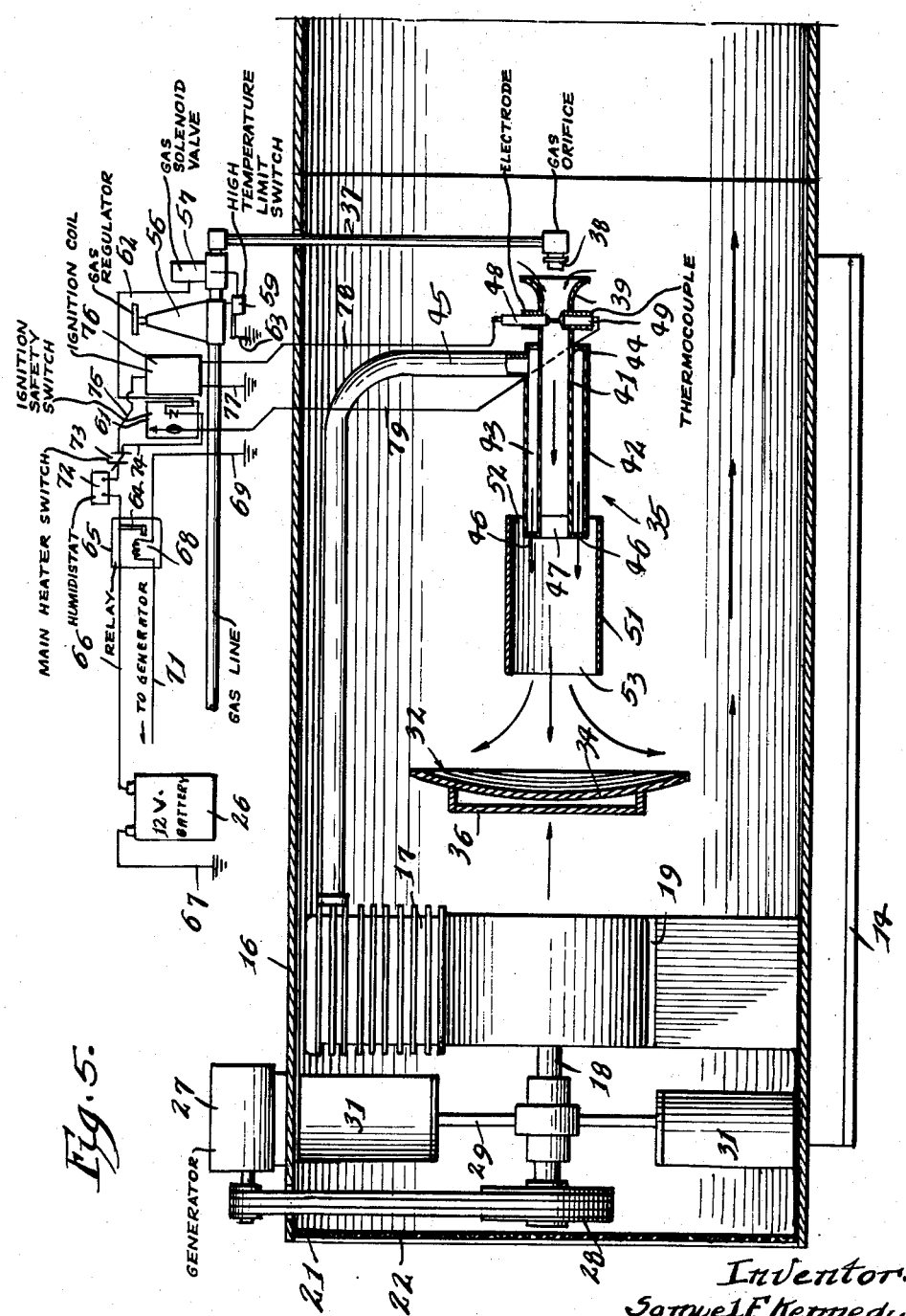
FIG. 5 is a vertical cross sectional view taken on the line 5—5 of FIG. 2 and showing the igniter assembly and schematically showing the control system for the ignition assembly.

Referring more particularly to the drawings wherein is shown an illustrative embodiment of the present invention, FIG. 1 discloses the dryer 10 connected through an entrance duct 11 to a storage bin 12 below a perforated floor 13 which is spaced above the bottom of the bin to provide a plenum chamber 12ª to allow circulation of the heated air. The grain or other commodity is placed on the perforated floor 13 and the air is forced up from the plenum chamber 12ª through the commodity to remove any undesirable moisture.

The dryer 10 is mounted on a pair of parallel skids 14, the skids having suitable cross-members 15 to strengthen the support for the dryer. The dryer is housed in an air duct housing or cylinder 16 which is suitably mounted on the skid. The air duct housing is of a size to fit an engine 17 mounted therein so as to position the output shaft 18 of the engine on the longitudinal axis of the duct or cylinder. The engine is rigidly mounted on a platform 19 which is suitably mounted within the cylinder 16. The engine is not provided with shrouding so as to eliminate as much air restriction as possible. A cover or housing 20 is positioned on the cylinder 16 to contain the control system for the dryer. An expanded or funnel intake may be provided in the open end 21 to increase the cubic feet per minute air intake. A screen 22 is preferably provided in the intake to prevent the entrance of extraneous material in the air.

The engine is specially designed with a short stroke to prevent extreme vibration and to assure long life through less piston travel. L.P. gas stored in a tank (not shown) of suitable size, preferably of 500 gallon minimum capacity, is piped to a carburetor 23 through a line 24, the carburetor vaporizing the gas, mixing the gas with air, and feeding the mixture to the engine. The carburetor has a conventional air filter 25 for air passing therethrough. A 12-volt battery 26, such as utilized in automobile engines, is the primary source of power for the engine and the control systems. Starting of the engine is accomplished by a built-in starter generator 27 through a belt 27a driven by the flywheel 28 of the engine.

A fan or blower 29 mounted on the shaft 18 has a plurality of vanes or blades 31 angularly positioned to provide maximum air travel through the cylinder to the storage bin. The fan is of a size to substantially completely occupy the total cross sectional area of the cylinder. Air is drawn into the open end 21 of the cylinder 16 and passes over and around the engine to accomplish two functions: (1) the air cools the engine, and (2) the engine heats the air being driven through the grain or other commodity in the storage bin.

Located intermediate the ends of the cylinder 16 is a disc-shaped target or deflector 32 mounted centrally in the cylinder by a plurality of radially extending supports 33. The target has a concave face 34 facing a burner assembly 35 for additional heating of the air passing through the cylinder. On the opposite side of the target is a heat shield 36 to protect the engine from excessive heat from the burner. The function of the target will become apparent later.

Adjacent the opposite open end of the air duct housing 16 is the burner assembly 35 also positioned on the longitudinal axis of and within the housing 16. The burner assembly includes a gas supply line 37 leading to an orifice 38 which sprays the gas into the primary air intake venturi 39 in the burner tube 41. Encompassing the burner tube is a pulse smoothing muffler-diffuser 42 forming an annular chamber 43 therebetween which is connected adjacent its closed end 44 with an exhaust line 45 from the engine 17. The opposite annular end 46 of the muffler-diffuser 42 is provided with a plurality of openings surrounding the open discharge end 47 of the burner tube 41.

Located within the burner tube 41 adjacent the primary air intake venturi 39 is an electrode 48 opposite a grounded thermocouple 49 to be explained later. Concentric with the diffuser 42 but spaced outwardly or forwardly thereof except for the rear end overlapping the discharge end of the diffuser tube is a combustion chamber 51. The annular spacing between this chamber and the diffuser 42 provides a secondary air intake 52. The opposite or forward open end 53 of the combustion chamber 51 is suitably spaced from the aligned disc-shaped target 32; the combustion chamber being centrally supported in the air duct housing 16 by a second set of radially extending supports 54 (FIG. 3).

Gas from the L.P. storage container through the line 24 is divided into two streams at a T-connector 55 (FIG. 4). One gas stream goes to the carburetor 23 for the engine 17 in a manner known in the art while the other gas stream is directed through the gas supply line 37 to the gas orifice 38. The gas passes through a regulator 56 for manual control of the intake pressure, a solenoid gas valve 57, a pressure gauge 58 and into the line 37. The regulator 56 is of conventional design and the pressure gauge 58 is calibrated in pounds per square inch gas pressure and in degrees temperature rise to provide ease in regulating the gas flow by the regulator 56.

The solenoid gas valve 57 is connected in series to a high temperature limit switch 59 and to the ignition safety switch 61 through a circuit line 62 in the electrical control system. The high limit switch 59 is connected through the line 63 to be grounded on the air duct cylinder 16. The ignition safety switch 61 is a low voltage relay operated by power generated by the thermocouple 49.

The battery 26 is connected to the contacts 64 of a relay 65 through a line 66; the other terminal of the battery being grounded as at 67. The solenoid coil 68 of the relay 65 is grounded at 69 and is connected to the starter-generator 27 by a line 71. From the relay 65, the power line 66 extends to an outlet 72 to which may be connected a humidistat or thermostat and thence to the main heater switch 73. This switch is a double-pole single-throw switch which is connected with two circuits, one of which includes a line 74 connected to the ignition safety switch 61, and the other circuit includes a line 75 connected to the ignition coil or transformer 76. The coil 76 is grounded at 77 and steps up the 12-volt power of the battery 26 in a well-known manner to approximately 10,000 volts to be delivered to the electrode 48 by the line 78 for the ignition spark for the L.P. gas issuing from gas orifice 38.

In operation, the high temperature limit switch 59 is normally closed and will open when a temperature of 175° F. is reached or exceeded to cut off the flow of gas through the gas solenoid valve 57 in case of overheating from lack of air should the fan stop or blockage occur to prevent the air flow from dissipating heat. The solenoid gas valve 57 is also normally closed and will not open until the thermocouple 49 reaches a predetermined temperature to actuate the ignition safety switch 61 through the line 79 and open the solenoid gas valve 57 allowing gas flow to the orifice 38. A suitable orifice opening for the burner has been found to be approximately 0.0785 inch.

The relay 65 is dependent on operation of the starter generator 27 to energize the coil 68 and close the contacts 64 so that the heater cannot operate if the engine 17 is not running. Further, the outlet 72 is adapted to receive a conventional humidistat or thermostat which measures the humidity or temperature within the storage bin 12 and will open the contacts of the outlet if the humidity drops below or the temperature rises above predetermined safe limits. The use of this outlet is optional depending on the necessity or desire for automatic control. Since all of these safety switches are wired in series, any one of these switches is operable to shut off the heater.

Another feature of the system relates to the ignition system and the gas solenoid valve. Rather than feeding gas through the orifice 38 to be ignited at the electrode 48 without knowing that the electrode is functioning properly, the present invention has the provision that ignition must be proven prior to gas flow. The ignition coil 76 delivers a voltage of approximately 10,000 volts from the secondary of the coil to the electrode 48 which in turn discharges a high voltage spark across the gap to the grounded thermocouple 49. The spark from the electrode generates heat at the thermocouple, and this heat produces an electric current to flow from the thermocouple to a magnetic coil in the ignition safety switch 61. The coil closes the normally open switch at a predetermined temperature to actuate the gas solenoid valve wired in series with the switch. Thus, gas is not fed through the orifice 38 until there is an electrical discharge present at the electrode. The absence of electrical discharge from the electrode 48 to the thermocouple 49 will result in insufficient voltage to retain the switch 61 in closed position and, consequently, the switch 61 will open to deactivate the solenoid gas valve 57 and shut off the gas supply.

With the engine 17 in operation, I.P. gas is fed from the storage tank to the carburetor 23, mixed with air and fed to the engine. The exhaust from the engine passes through the line 45 to the closed end 44 of the muffler-diffuser 42. The engine rotates the output shaft 18 and the fan or blower 29 to draw air into the funnel intake 21 of the air duct housing 16 and past the engine. As previously stated, the air flow functions to cool the engine and at the same time, the air is initially heated by the heat dissipated from the engine. The air then flows past the disc-shaped target 32 to create a low pressure area downstream of the target.

As the engine is running, the starter-generator 27 driven by the flywheel 28 energizes the coil 63 of the relay 65 to close the contacts 64. The main heater switch 73 is closed to feed 12 volts from the battery 26 to the primary of the ignition coil 76 with the secondary feeding approximately 10,000 volts to the electrode 48 to create the high voltage spark. The thermocouple 49 being heated from the spark closes the ignition safety switch 61 to open the gas solenoid valve 57. Gas flows through the line 37 to the orifice 38 where it is sprayed into the primary air intake venturi 39 and ignited by the spark from the electrode 48. The low pressure area downstream of the target siphons or draws the gas toward the target 32 mixing the gas with air drawn in through the primary air intake venturi 39. The burning mixture travels through the burner tube 41 and mixes with the engine exhaust exiting through the openings 46 in the end of the muffler-diffuser 42 and with additional air drawn through the secondary air intake 52 in the combustion chamber 51.

The resulting combustion in the chamber 51 scrubs the engine exhaust of all unburned particles as well as insuring complete combustion of the gas passing through the burner tube 41. The flame is drawn from the combustion chamber 61 toward and strikes the concave face 34 of the target 32 due to the low pressure area downstream of the target, where the flame is uniformly outwardly dispersed into the air stream and reversed in direction to further heat the air. The reverse fire principle allows complete combustion within the very short space of travel from the burner to the deflector or target 32. This heated air has a resulting lowering of the humidity thereof and passes from the air duct housing 16 through the entrance duct 11 into the storage bin 12 below the perforated floor 13 into the plenum chamber 12ᵃ. The heated air pressurizes the plenum chamber and the air is forced upward through the floor 13 and the commodity to be dried. The temperature of the heated air can be increased or decreased by adjustment of the pressure regulator 56 or by using a modulating valve to control the quantity of gas flow.

Grain or other commodities to be dried generally have an approximate moisture content of 25% prior to storage and this moisture content must be reduced to approximately 14% for the grain or other commodity to be at optimum storage conditions. Storage bins available today range from 1000 to 10,000 bushels capacity with the average form storage bin having a capacity of approximately 3300 bushels. It has been found that the most efficient drying is accomplished at a rate of substantially six cubic feet of air per bushel per minute. Using this optimum value and the rate of air passing through the dryer due to the fan, the maximum number of bushels of grain to be dried at any one time in the bin can be determined. If such maximum number of bushels is less than the capacity of the bin, the drying of the contents must be accomplished in several stages until the bin is full.

The following table illustrates the drying characteristics for several fan or blower sizes and actuating motors.

*Table I*

| Intake | Motor, H.P. | Air Flow, cu.ft./min. | Storage Bin, bu. |
|---|---|---|---|
| 22½ in | 7½ | 10,000 | 3,300 |
| 24½ in | 12½ | 14,000 | 4,400 |
| 36 in | 25 | 20,000–22,000 | 6,000 |

There is a lag in the drying of the grain, and therefore, the six cubic feet per bushel per minute is applied to obtain the maximum fill for efficient operation. A second fill after the first fill has been dried to the proper moisture content, will necessarily be of less quantity due to the decreased air flow in the second fill because of the resistance to air flow afforded by the previously dried grain therebelow.

To dry grain from an initial moisture content of 25% to a final moisture content of 14%, approximately eight pounds of water must be removed from each bushel of grain. A heat input of approximately 2000 B.t.u. is required to remove one pound of water when the dryer is operating at recommended temperatures. Knowing the number of bushels of grain to be dried in one batch and the pounds of water to be removed from each bushel, the total heat input to dry the grain to optimum conditions can be calculated. Then by determining the heat input of the dryer in B.t.u.'s per hour, the approximate drying time for the grain can be calculated.

However, rather than relying on the above calculation, a more accurate method of determining when the grain has reached optimum moisture content would be to use a moisture tester for the grain or a humidistat in the storage bin connected to the control circuit for the heater.

While this invention has been shown and described as being advantageously applicable to a grain drying operation, it is not my desire or intent to unnecessarily limit the scope or utility of the improved features by virtue of this illustrative embodiment.

Having thus disclosed the invention, I claim:

1. A portable forced heat dryer comprising an air duct housing having open ends, an engine mounted within said housing adjacent one open end and having a drive shaft, a fan mounted on said drive shaft within said open end and adapted to draw air into the housing through said open end when driven by said engine, a heater assembly within the opposite open end of the housing, a portable gas source supplying gas to said engine and said heater assembly, said heater assembly including a gas orifice mounted centrally in the housing and communicating with the gas source, a burner tube spaced from said gas orifice a venturi throat on the end of the burner tube adjacent the orifice to draw air into the burner tube, an electrode in said burner tube forwardly of said venturi throat adapted to ignite the gas-air mixture passing through the burner tube, a muffler-diffuser encompassing the burner tube and forming an annular chamber concentric with the burner tube, said annular chamber being closed at the end adjacent the gas orifice, a conduit between said engine and said closed end of the annular chamber conducting exhaust gases thereto, the opposite end of said annular chamber having a plurality of relatively small openings concentric with the exhaust end of the burner tube, a combustion chamber positioned forwardly but overlapping an end of the burner tube and the muffler-diffuser, said combustion chamber being of a larger diameter than and concentric with the muffler-diffuser, an annular air inlet between the muffler-diffuser and the combustion chamber to draw additional air into the gaseous mixture to support combustion whereby unburned components of said exhaust gas are ignited, and a target spaced from the end of the combustion chamber and having a concave surface facing said combustion chamber for intercepting and dispersing the ignited gases directed thereagainst to mix and heat the air stream passing through said housing.

2. A portable forced heat dryer as set forth in claim 1, in which a solenoid valve is positioned between the gas source and the orifice, and means at the electrode to control the solenoid valve by the temperature at said electrode thus controlling the gas flow to the gas orifice.

3. A portable forced heat dryer as set forth in claim 1, in which an air duct is secured to the exhaust end of said housing and communicates with a storage bin, said bin having a perforated floor through which the heated air is passed upward into a commodity to be dried.

4. A portable forced heat dryer as set forth in claim 1, in which a flywheel is secured to the drive shaft of the engine, a starter-generator secured to the exterior of the housing, a drive belt between the flywheel and the starter-generator, and carburetion means to deliver an air-gas vapor mixture to said engine for combustion.

5. A portable forced heat dryer comprising an air duct housing having opposite open ends, an internal combustion engine and blower mounted within said housing adjacent one end and having a drive shaft and a fan mounted on and driven by said drive shaft, a generator driven by said engine, a source of electric power for the engine, a burner assembly mounted within and adjacent the opposite open end of the housing, said burner assembly including a gas orifice, a burner tube receiving gas from said orifice in a direction countercurrent to the air flow, an electrode in the burner tube to ignite the gas, means to mix the exhaust gas from the combustion engine with the ignited gas, and a target having a concave surface intercepting and dispersing the ignited gases directed thereat, a source of gas for said engine and said burner assembly, and a control assembly for said heater assembly including a thermocouple positioned in said burner tube opposite the electrode, an ignition safety switch connected to said thermocouple, a solenoid gas valve between said gas source and said gas orifice and connected to said ignition safety switch such that the electrode provides a high voltage spark to the thermocouple and when the thermocouple is heated by said spark to a sufficient extent the ignition safety switch will be closed and the solenoid gas valve opened to permit gas flow to said gas orifice.

6. In a control system for a heating apparatus including a gas heater assembly operatively connected with an internal combustion engine for concurrent operation therewith, a generator driven by said engine, a relay having a coil adapted to be energized by operation of said generator and a pair of contacts adapted to be closed upon energization of said coil, a source of electric power, a main heater switch, a circuit from said power source to the main heater switch and including said contacts of the relay, a first circuit from the main heater switch including in series an ignition coil, an electrode, a thermocouple spaced from said electrode, and an ignition safety switch, a coil in said ignition safety switch connected to said thermocouple, said electrode being adapted when said circuit is energized to provide a spark to the thermocouple for igniting gas in the heater, said coil of the ignition safety switch being energized upon a temperature increase of said thermocouple, and a second circuit from the main heater switch including in series a pair of contacts in said ignition safety switch, a solenoid, and a high temperature limit switch, said solenoid being adapted and arranged to operate a gas valve to control the flow of gas to said gas heater, said contacts being adapted to close upon energization of the coil of the ignition safety switch and complete said second circuit thereby to actuate the solenoid and operate the gas valve so as to allow gas to flow to said gas heater, said limit switch being adapted to open when the heater temperature exceeds a predetermined level.

7. In a control system as set forth in claim 6, in which a humidistat is coupled in series in the circuit between the electric power source and the main heater switch.

References Cited in the file of this patent

UNITED STATES PATENTS

| | | |
|---|---|---|
| 1,863,391 | Bluemel | June 14, 1932 |
| 2,595,773 | Davis | May 6, 1952 |
| 2,628,475 | Heath | Feb. 17, 1953 |
| 2,864,960 | Von Linde et al. | Dec. 16, 1958 |
| 2,983,500 | Finley et al. | May 9, 1961 |
| 3,057,611 | Bjerkan | Oct. 9, 1962 |

FOREIGN PATENTS

| | | |
|---|---|---|
| 622,120 | Germany | Nov. 21, 1935 |